United States Patent
Barber

[15] 3,680,741
[45] Aug. 1, 1972

[54] FERTILIZER DISTRIBUTOR

[72] Inventor: James R. Barber, 1404 N. Regal, Spokane, Wash. 99202

[22] Filed: Dec. 16, 1970

[21] Appl. No.: 98,743

[52] U.S. Cl. ................... 222/177, 239/167, 239/664, 239/675
[51] Int. Cl. ............................................. A01c 15/00
[58] Field of Search ...... 222/176, 177, 178; 239/664, 239/675, 683, 672, 160, 166, 167

[56] References Cited

UNITED STATES PATENTS

| | | | |
|---|---|---|---|
| 3,259,278 | 7/1966 | Barber et al. | 222/178 |
| 2,929,634 | 3/1960 | Gandrud | 222/177 X |
| 3,013,803 | 12/1961 | Piester | 239/664 |
| 3,331,607 | 7/1967 | Sammarco | 239/664 |

Primary Examiner—Robert B. Reeves
Assistant Examiner—James M. Slattery
Attorney—Wells, St. John & Roberts

[57] ABSTRACT

A fertilizer distributor comprising a truck-mounted storage hopper and cantilevered distributing hoppers carried on the truck at the rear end and movable between storage positions alongside the truck and operational positions projecting laterally outward from the truck. An improved drive mechanism is disclosed for powering the metering shaft mechanism in the distributing hoppers. A selectively powered central drive unit is mounted at the rear of the truck, taking power by engagement with one truck wheel. Meshing chain flights at the inner ends of the distributing hoppers automatically engage the drive unit while the distributing hoppers are in their respective operational positions. One or both distributing hoppers may be selectively powered from the common drive unit to assure an even rate of application of fertilizer across one half or the entire width of the apparatus.

3 Claims, 5 Drawing Figures

PATENTED AUG 1 1972 3,680,741

FERTILIZER DISTRIBUTOR

BACKGROUND OF THE INVENTION

This invention relates to bulk fertilizer distributors of the type used commercially for hauling solid fertilizer to a field and for field distribution purposes. The disclosure is concerned primarily with the simplification of the support and driving apparatus for movable distributing hoppers mounted at the rear of such a truck unit. It provides an economical alternative to prior arrangements for mechanically driving the powered metering shaft equipment in the distributing hopper at opposite sides of the unit. The present drive arrangement is automatically engaged by proper positioning of the distributing hoppers for operational use.

An example of a prior fertilizer distribution apparatus wherein the distributing hoppers were powered by separate mechanical connections to the rear wheels of the supporting truck is shown in U.S. Pat. No. 3,259,278, granted July 5, 1966.

SUMMARY OF THE INVENTION

The invention disclosed herein is an improvement in a drive mechanism for powering the controlling shaft of a distributing hopper in a truck-mounted fertilizer distributor. The basic distributing apparatus includes a distributing hopper movably supported at the rear end of a truck having a fertilizer storage hopper mounted thereon. The distributing hopper is movable between a storage position alongside the storage hopper and an operational position protruding laterally outward from the truck. The improvement in the drive mechanism includes a selectively activated drive unit mounted at the rear center of the truck and cooperative driven means mounted at the inner end of each distributing hopper. The respective locations of the drive unit and driven means is such that they will be mechanically meshed when the distributing hopper is at its operational position.

It is a first object of this invention to simplify driving engagement of a movable distributing hopper mounted at the rear of a supporting truck.

Another object of this invention is to provide a mechanical drive between the truck wheels and a pair of movable distributing hoppers, the drive being automatically engaged upon movement of each distributing hopper to its operational position.

Another object of this invention is to utilize a common drive mechanism for more than one distributing hopper in order to assure even distribution of fertilizer across the width of the entire apparatus.

These and further objects will be evident from the following disclosure, taken also with the accompanying drawings which disclose the details of the preferred embodiment of the invention. It is to be understood that this particular form of the invention is not totally restrictive and that the invention disclosed is spelled out more fully in the claims appended thereto.

DESCRIPTION OF THE PREFERRED EMBODIMENT

Figure 1:
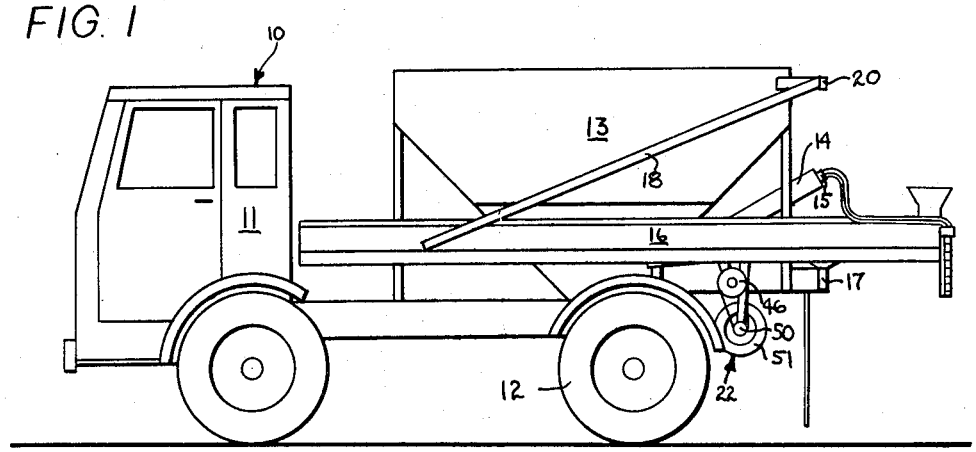
FIG. 1 is a side view of the truck and fertilizer distribution apparatus with the distributing hoppers in storage positions.
Figure 2:
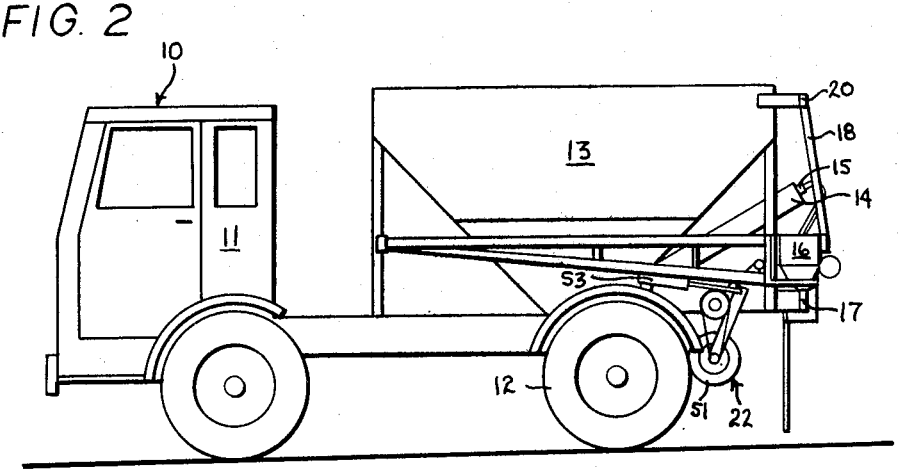
FIG. 2 is a side view similar to FIG. 1, showing the distributing hoppers in their operational positions.
Figure 3:
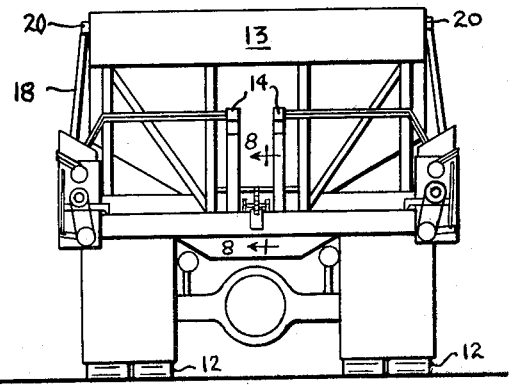
FIG. 3 is an end view of the apparatus as seen in FIG. 1.
Figure 4:
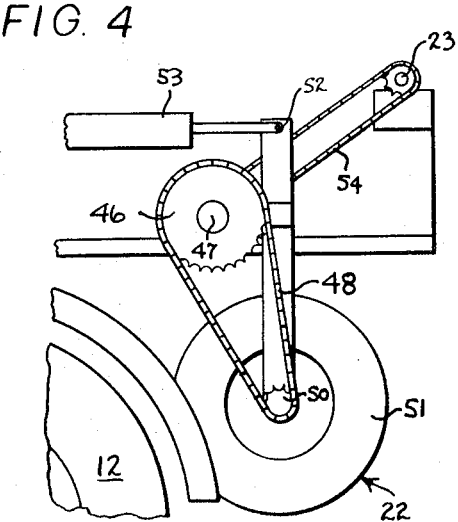
FIG. 4 is a schematic side view of the wheel-engaging drive assembly.
Figure 5:
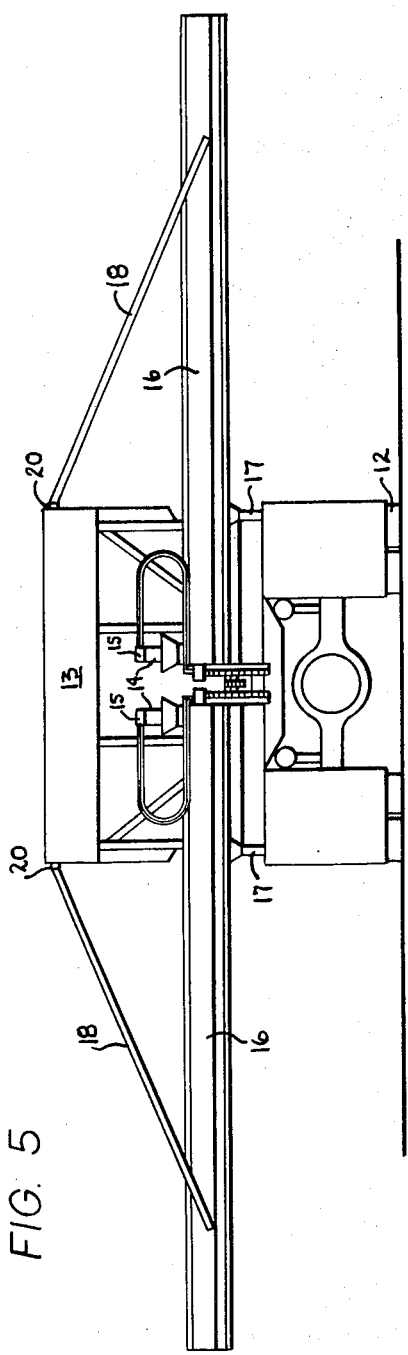
FIG. 5 is an end view of the apparatus as seen in FIG. 2.

FIGS. 1-5 generally illustrate the features of the present fertilizer distributor. It basically comprises a truck-mounted storage facility for fertilizer in combination with distributing hoppers and metered feed assemblies mounted on the truck and connected to the storage hopper by a delivery auger system. The distributing hoppers are foldable relative to the truck between a storage or a transfer position alongside the truck and extended lateral positions substantially parallel to the supporting ground surface. FIGS. 1 and 3 illustrate the hopper storage positions. FIGS. 2, 4 and 5 illustrate the hopper operational positions. One or both distributing hoppers may be used at any chosen time, depending upon the width of the area along which fertilizer is to be distributed in the field.

The basic truck that supports the apparatus is conventional and illustrated by the numeral 10. It includes a cab 11 within which the driver of the truck has all necessary controls for the operation of the machinery. Truck 10 is provided with rear driving wheels 12. It supports a storage hopper 13, which receives bulk solid fertilizer for transport and distributing purposes. Hopper 13 is provided with a pair of rearwardly and upwardly directed discharge conveyors 14, which typically comprise powered augers for removing fertilizer from the interior of hopper 13 at a controlled rate of speed, the fertilizer being discharged adjacent to the upper end of each conveyor 14 while the conveyor is operational. The individual conveyors 14 are illustrated as being powered by independent hydraulic motors 15 mounted at their other ends.

A pair of elongated distributing hoppers 16 are mounted to the rear corners of truck 10. They are supported about a fixed vertical axis at each corner of truck 10. Pivotal support is provided by a lower fixed bearing 17 that receives an upright shaft protruding downwardly from each distributing hopper 16. Outward support is provided by a diagonal brace 18 fixed to the respective hopper 16 and pivotally mounted to the storage hopper 13 about a pivot connection 20 coaxially aligned with the bearing 17. As seen in the drawings, the distributing hoppers 16 are individually movable between the storage position extending alongside truck 10 to an operational position perpendicular to the longitudinal center line of truck 10. Such movement is afforded by manually pivoting the respective hoppers 16 about the upright vertical axis of the respective bearing 17 and pivot connections 20.

Each distributing hopper 16 has downwardly converging longitudinal sides that lead to controlled lower openings spaced along the length of each hopper 16. Immediately above these openings is a metered feed screw that extends along the entire length of the distributing hopper 16 and which serves to agitate and control movement of fertilizer through the lower discharge openings. The metered feed screw is centered along a shaft designated by the numeral 21. It is constantly rotated during the distribution of the fertilizer and its speed preferably is varied in direct proportion to the field speed of truck 10. It is the manner by which this shaft 21 is powered that constitutes the basic development of the present disclosure. Further details of the distributing hoppers can be seen by a study of U.S. Pat. No. 3,259,278, which illustrates the distributing hopper apparatus in greater detail than is shown herein.

Figure 7:
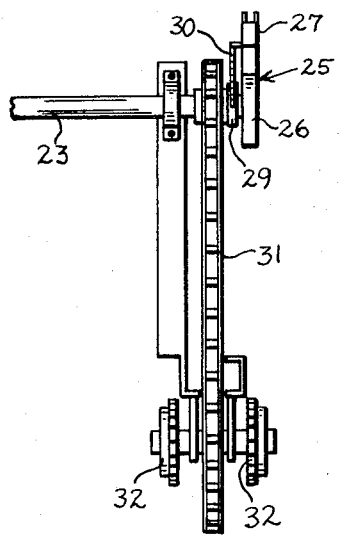
FIG. 7 is an enlarged fragmentary and view of the drive mechanism as seen in FIG. 3.
Figure 8:
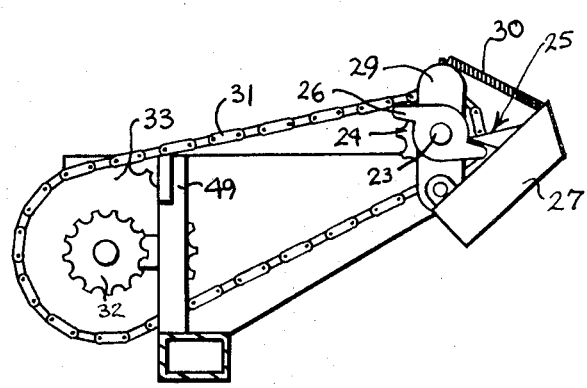
FIG. 8 is an enlarged fragmentary sectional view as seen substantially along line 8—8 in FIG. 3.

In the present apparatus, driving power for the individual shafts 21 in each distributing hopper 16 is provided from a central drive apparatus 22 at the rear of truck 10. The drive apparatus itself is shown in detail in FIGS. 7 and 8. It includes a transverse powered shaft 23 that drives a sprocket 24 through a clutch mechanism 25. The hub of sprocket 24 is rotatably mounted about the axis of shaft 23. Fixed to the hub of sprocket 24 is a clutch member 29 that pivotally mounts a single tooth bracket 27 about a pivotal axis at 23. A center toothed member 26 is fixed to the outer end of shaft 23 and rotates with shaft 23. A tension spring 30 connects the outer ends of the pivotally connected elements 27, 29, urging the member 27 toward the center toothed member 26. Clutch 25 is designed to transmit rotary movement from shaft 23 to sprocket 24 in the counterclockwise direction of rotation as seen in FIG. 7. If shaft 23 is rotated in the opposite direction, spring 30 permits the member 27 to pivot out of the path of the rotating teeth on member 26, so that sprocket 24 is not rotated. This is used to prevent discharge of material from the fertilizer distributing hoppers 16 during reversal of truck 10 in the field.

The sprocket 24 drivingly engages a rearwardly extending chain 31 which is engaged about an outer sprocket 33 having a short central shaft fixed to it and extending to both sides thereof. The shaft mounts a pair of drive sprockets 32 at the respective ends thereof. Sprockets 32 are therefore rotated at all times during which rotational movement is transmitted to sprocket 24 through the clutch mechanism 25.

Figure 9:
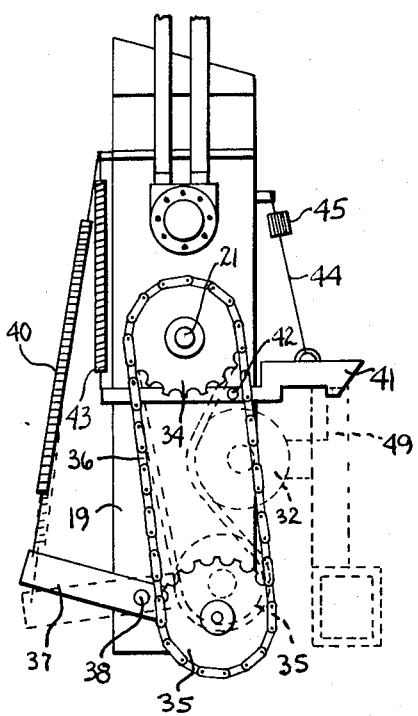
FIG. 9 is an enlarged fragmentary end view of a distributing hopper as viewed substantially along line 9—9 in FIG. 6.
Figure 10:
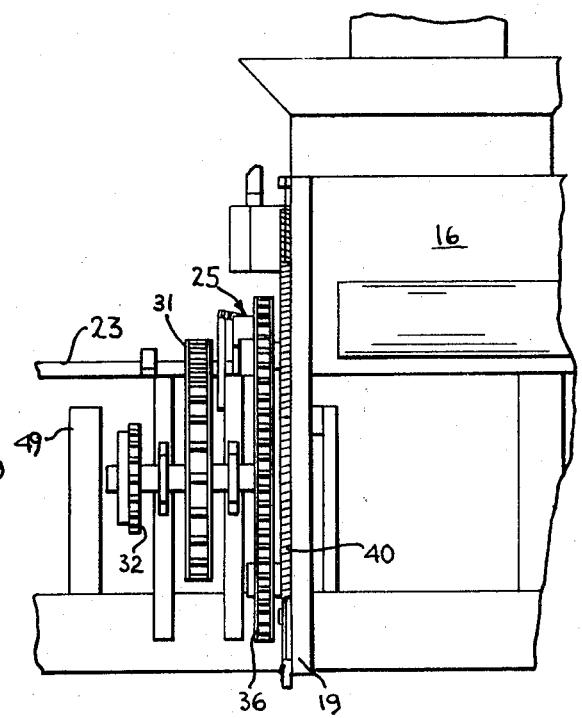
FIG. 10 is an enlarged fragmentary end view of the center rear portion of the assembly with only one distributing hopper engaged by the drive unit.

At the outer end of each distributing hopper 16 is an upright plate 19 that extends downwardly beneath the lower surfaces of hopper 16 and on which is mounted the elements that drivingly engage the central drive apparatus 22. The drive arrangement, which is identical at the outer end of each hopper 16, essentially comprises a sprocket 34 fixed to the shaft 21 and powered by a length of chain 36 engaged about a lower idler sprocket 35. Sprocket 35 is rotatably journalled on a shaft carried on a pivoted lever 37. Lever 37 is pivotally connected to the plate 19 about an axis designated at 38. Tension is maintained in chain 36 by a suitable tension spring 40 connected between the outer end of lever 37 and an upper bracket on the plate 19 (FIG. 9).

Figure 6:
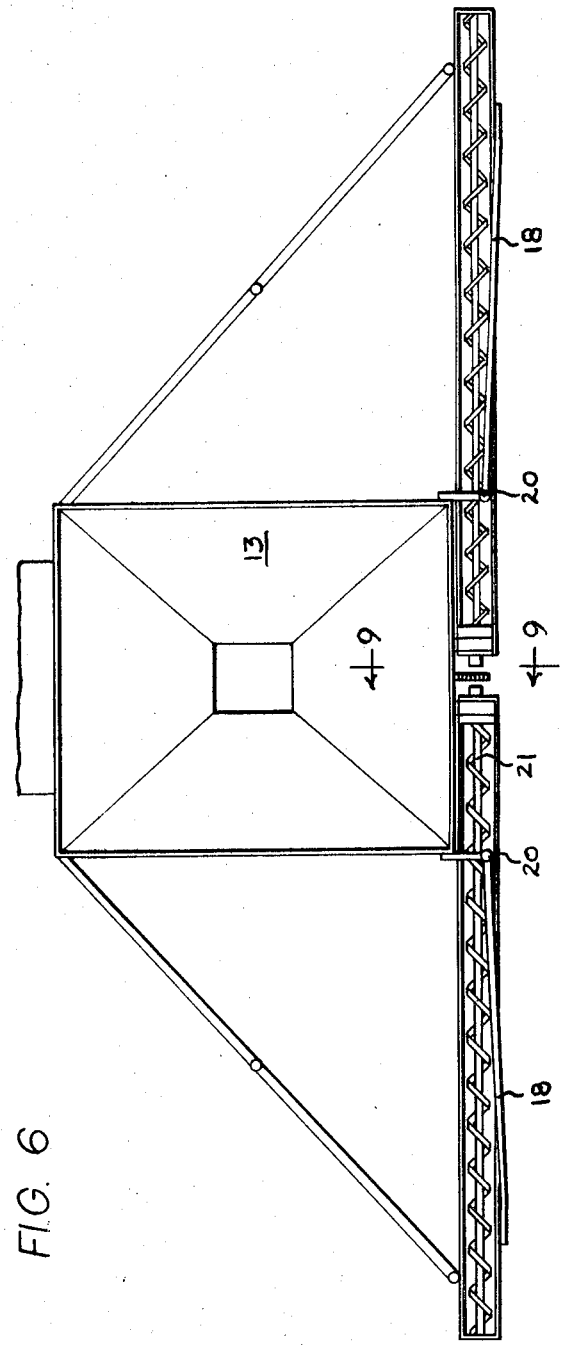
FIG. 6 is a top view of the apparatus as seen in FIG. 5; the forward portion of the truck and storage hopper being broken away.

The position of chain 36 on each hopper 16 is such that its locus about the bearing 17 that pivotally mounts the hopper 16 to truck 10 intersects the position of the drive sprocket 32 at that side of the apparatus. Thus, when the distributing hopper 16 is pivoted to the operational position shown in FIGS. 2, 5 and 6, the chain 36 will be engaged by a sprocket 32 at an elevation intermediate sprockets 34 and 35 to drivingly connect chain 36 to the power shaft 23 (See dashed line illustration at FIG. 9).

A pivoted latch 41 mounted at 42 to the upright plate 19 secures each hopper 16 relative to the rear of truck 10 when the hopper 16 is in its operational position. Latch 41 is biased downwardly by a tension spring 43 connected between its outer end and a bracket on plate 19. It automatically engages an upright bar 49 (FIG. 8) fixed to a cross member at the rear of truck 10 in the pivotal path of latch 41 about the axis of bearing 17. The operational engagement of latch 41 and chain 36 on a single hopper 16 is illustrated in dashed lines in FIG. 9.

To facilitate release of latch 41, a cable 44 extends along the hopper 16 and is guided by elevated pulley assemblies 45. Cable 44 is normally slack so as not to interfere with proper engagement of latch 41. When hopper 16 is to be released from its operational position by manual pivoting of the hopper about the axis of its bearing 17, the person positioning hopper 16 simply pulls cable 44 to release latch 41, which then allows the hopper 16 to be pivoted to its storage or transfer position along side truck 10.

The central drive apparatus 22 might be powered independently of the vehicle on which it is mounted. However, it is preferably driven at a speed directly proportional to the speed of truck 10. This is accomplished by means of a wheel-engaging drive apparatus at the side of the truck as seen in FIGS. 1, 2 and 4. A driven sprocket 46 is rotatably mounted on truck 10 about the axis of a transverse shaft 47 fixed to the sprocket 46. Sprocket 46 is powered by a chain 48 engaged about a sprocket 50 mounted to the hub of a wheel 51 that is positioned so as to frictionally engage the periphery of the adjacent rear driving wheel 12. A wheel support frame 52 for the wheel 51 is pivotally mounted about the axis of shaft 47 and is selectively positioned by a double-acting cylinder assembly shown at 53. The cylinder assembly 53 is operatively connected between the frame of truck 10 and the outer end of the wheel support frame 52. By selective operation of the cylinder assembly 53 one can cause wheel 51 to engage wheel 12 to impart driving motion to sprocket 46, or alternately release wheel 51 from such driving engagement, thereby terminating rotation of sprocket 46.

The sprocket 46 is operatively connected to the transverse power shaft 23 by means of an intermediate connecting chain shown generally at 54 (FIG. 4). Obviously, the proportional speed of shaft 23 relative to shaft 47 can be varied by proper selection of the sprocket diameters interposed in the drive arrangement including connecting chain 54. One can therefore preset the apparatus to insure required rotation of the shaft 21 in the distributing hopper 16 to provide proper distribution of material therefrom.

The present apparatus provides a mechanically simple drive mechanism for automatically engaging and disengaging the powered connection to one or both distributing hoppers 16 by simply pivoting the selected hopper 16 relative to the truck 10. The proper positioning of each hopper 16 automatically engages latch 41 and chain 36 to drivingly connect that hopper to the central drive apparatus 22 and mechanically maintain the hopper 16 in its operational position relative to the truck. No further manipulation or adjustment of the components is necessary. One can then control the drive to the distributing hopper by operation of cylinder assembly 53. Since material will normally be distributed only while truck 10 is moving in a forward direction, the previously-described clutch assembly 25 is utilized to prevent accidental operation of the distributing mechanism during reverse operation of truck 10 should this occur without release of wheel 51.

Various modifications might be made in the illustrated structure without deviating from the basic concepts disclosed herein. For these reasons, the invention is not to be limited except as set out in the following claims.

I claim:

1. In combination with:
   a wheeled truck having a fertilizer storage hopper supported thereon;
   a fertilizer distributing hopper movably supported at the rear end of the truck for movement between a storage position alongside the storage hopper and an operational position protruding laterally outward at one side of the truck;
   a feed conveyor means on said truck for selectively directing fertilizer from said storage hopper to said distributing hopper;
   said distributing hopper including a longitudinal shaft mounted therein for rotation about the central shaft axis and protruding outward beyond the distributing hopper at the inner end thereof when in its operational position;
   the improvement in means for powering said shaft, comprising:
   driven means mounted to the inner end of said distributing hopper operatively connected to said shaft;
   powered drive means mounted on said truck at the rear end thereof, said powered drive means being located on said truck at a position intersecting the path of said driven means as the distributing hopper is moved from its storage position to its operational position, said drive means being operatively engaged by said driven means only when the distributing hopper is at its operational position;
   said powered drive means comprising:
   a sprocket mounted to said truck for rotation about a transverse axis;
   a power connection operatively driving said sprocket about said axis;
   said driven means comprising a yieldable chain flight mounted on said distributing hopper drivingly connected to said shaft, said flight being in meshed driving engagement with said sprocket only when the distributing hopper is at its operational position.

2. In combination with:
   a wheeled truck having a fertilizer storage hopper supported thereon;
   a fertilizer distributing hopper movably supported at the rear end of the truck for movement between a storage position alongside the storage hopper and an operational position protruding laterally outward at one side of the truck;
   feed conveyor means on said truck for selectively directing fertilizer from said storage hopper to said distributing hopper;
   said distributing hopper including a longitudinal shaft mounted therein for rotation about the central shaft axis and protruding outward beyond the distributing hopper at the inner end thereof when in its operational position;
   the improvement in means for powering said shaft, comprising:
   driven means mounted to the inner end of said distributing hopper operatively connected to said shaft;
   powered drive means mounted on said truck at the rear end thereof, said powered drive means being located on said truck at a position intersecting the path of said driven means as the distributing hopper is moved from its storage position to its operational position, said drive means being operatively engaged by said driven means only when the distributing hopper is at its operational position;
   said powered drive means comprising:
   a sprocket mounted to said truck for rotation about a transverse axis;
   a power connection releasably interposed between one truck wheel and said sprocket;
   said driven means comprising a yieldable chain flight mounted on said distributing hopper drivingly connected to said shaft, said flight being in meshed driving engagement with said sprocket only when the distributing hopper is at its operational position.

3. The apparatus as set out in claim 2 further comprising:
   a releasable latch operatively connected between the truck and said distributing hopper for selectively fixing said distributing hopper in its operational position.

* * * * *